(12) United States Patent
Tsuda et al.

(10) Patent No.: US 7,696,268 B2
(45) Date of Patent: Apr. 13, 2010

(54) PROCESS FOR PRODUCING AQUEOUS FLUOROPOLYMER DISPERSION AND AQUEOUS FLUOROPOLYMER DISPERSION

(75) Inventors: Nobuhiko Tsuda, Settsu (JP); Chie Sawauchi, Settsu (JP); Yasuhiko Sawada, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 994 days.

(21) Appl. No.: 10/577,424

(22) PCT Filed: Oct. 29, 2004

(86) PCT No.: PCT/JP2004/016155

§ 371 (c)(1),
(2), (4) Date: Apr. 27, 2006

(87) PCT Pub. No.: WO2005/042593

PCT Pub. Date: May 12, 2005

(65) Prior Publication Data

US 2007/0135558 A1 Jun. 14, 2007

(30) Foreign Application Priority Data

Oct. 31, 2003 (JP) .............................. 2003-373380

(51) Int. Cl.
*C08K 5/42* (2006.01)
(52) U.S. Cl. .................. 524/156; 524/163; 524/164; 524/165; 524/236; 524/241; 524/288; 524/544; 524/545; 524/546
(58) Field of Classification Search ................ 524/156, 524/163, 164, 165, 236, 241, 288, 544, 545, 524/546
See application file for complete search history.

(56) References Cited

U.S. PATENT DOCUMENTS 6,169,139 B1 * 1/2001 van Cleeff ................. 524/544

6,774,164 B2 * 8/2004 Lyons et al. ................ 524/157
6,833,403 B1    12/2004 Blädel et al.
2002/0193500 A1 * 12/2002 Hintzer et al. ............. 524/546
2005/0038177 A1    2/2005 Hoshikawa et al.

FOREIGN PATENT DOCUMENTS

| CN | 1351616 A | 5/2002 |
|---|---|---|
| EP | 1 160 298 A1 | 12/2001 |
| GB | 2 071 112 A | 9/1981 |
| JP | 49-29303 | 8/1974 |
| JP | 49-29303 B | 8/1974 |
| JP | 58-34814 | 3/1983 |
| JP | 58-34814 A | 3/1983 |
| JP | 2002-532583 | 10/2002 |
| JP | 2003-119204 | 4/2003 |
| JP | 2003-119204 A | 4/2003 |
| JP | 2003-268034 | 9/2003 |
| JP | 2003-268034 A | 9/2003 |
| JP | 2005-8775 | 1/2005 |
| JP | 2005-8775 A | 1/2005 |
| WO | 00/71590 A1 | 11/2000 |
| WO | WO 03/078479 A1 | 9/2003 |

* cited by examiner

*Primary Examiner*—Bernard Lipman
(74) *Attorney, Agent, or Firm*—Sughrue Mion, PLLC

(57) ABSTRACT

The present invention provides a method of producing a fluoropolymer aqueous dispersion by which the fluorine-containing emulsifier contained in the fluoropolymer aqueous dispersion as obtained after polymerization can be efficiently removed as well as a fluoropolymer aqueous dispersion low in fluorine-containing emulsifier concentration. The present invention is a method of producing a fluoropolymer aqueous dispersion which comprises carrying out a concentration treatment comprising a concentration operation of a pretreatment fluoropolymer aqueous dispersion, wherein the pretreatment fluoropolymer aqueous dispersion is obtained by carrying out a polymerization in an aqueous medium in the presence of a fluorine-containing surfactant (A), the fluorine-containing surfactant (A) is a fluorine-containing surfactant having an octanol/water partition coefficient of 1.5 to 3.5.

11 Claims, No Drawings

PROCESS FOR PRODUCING AQUEOUS FLUOROPOLYMER DISPERSION AND AQUEOUS FLUOROPOLYMER DISPERSION

FIELD OF THE INVENTION

This invention relates to a method of producing a fluoropolymer aqueous dispersion, to a fluoropolymer aqueous dispersion, to a fluoropolymer powder, and to a fluoropolymer molding.

BACKGROUND OF THE INVENTION

The method of producing a fluoropolymer aqueous dispersion generally comprises carrying out the polymerization in an aqueous medium in the presence of a fluorine-containing emulsifier. It has so far been demanded that concentration of the fluorine-containing emulsifier contained in the aqueous dispersion obtained after polymerization be as low as possible so as not to influence the physical properties, among others, of the moldings obtained therefrom, without deteriorating the dispersion stability of fluoropolymer particles.

As a method of producing fluoropolymer aqueous dispersions reduced in fluorine-containing emulsifier concentration, there is disclosed the method comprising adding a nonionic surfactant to the aqueous dispersion after polymerization and then contacting the mixture with an anion exchange resin to thereby remove the fluorine-containing emulsifier (cf. e.g. Patent Document 1: Japanese Kohyo Publication 2002-532583).

This production method, however, has a problem; the nonionic surfactant added to the fluoropolymer aqueous dispersion obtained mostly remains in the dispersion.

As another method of producing fluoropolymer aqueous dispersions reduced in fluorine-containing emulsifier concentration, there is disclosed the method of a polytetrafluoroethylene aqueous dispersion comprising adding water and a specific nonionic surfactant to the aqueous dispersion obtained after carrying out the polymerization in the presence of a perfluorocarboxylic acid type surfactant and then subjecting the mixture to electric concentration (cf. e.g. Patent Document 2: Japanese Kokai Publication 2003-268034).

This production method, however, has a problem; the nonionic surfactant added to the fluoropolymer aqueous dispersion obtained mostly remains in the dispersion, because the production method comprises the step of adding the specific nonionic surfactant before the electric concentration.

DISCLOSURE OF INVENTION

Problems Which the Invention is to Solve

In view of the above-discussed state of the art, it is an object of the present invention to provide a method of producing a fluoropolymer aqueous dispersion by which the fluorine-containing emulsifier contained in the fluoropolymer aqueous dispersion as obtained after polymerization can be efficiently removed as well as a fluoropolymer aqueous dispersion low in fluorine-containing emulsifier concentration.

Means for Solving the Problems

The present invention is a method of producing a fluoropolymer aqueous dispersion which comprises carrying out a concentration treatment comprising a concentration operation of a pretreatment fluoropolymer aqueous dispersion, wherein the pretreatment fluoropolymer aqueous dispersion is obtained by carrying out a polymerization in an aqueous medium in the presence of a fluorine-containing surfactant (A), the fluorine-containing surfactant (A) is a fluorine-containing surfactant having an octanol/water partition coefficient of 1.5 to 3.5.

The present invention is a fluoropolymer aqueous dispersion which is obtained by the above-mentioned method of producing a fluoropolymer aqueous dispersion.

The present invention is a fluoropolymer aqueous dispersion containing a particle comprising a fluoropolymer dispersed in an aqueous medium, wherein the fluoropolymer aqueous dispersion contains a fluorine-containing surfactant (A) in an amount of not smaller than 0.1 ppm but not greater than 5% by mass and has a solid matter concentration of 30 to 80% by mass, the fluorine-containing surfactant (A) has an octanol/water partition coefficient of 1.5 to 3.5.

The present invention is a fluoropolymer powder which is obtained by drying a wet powder obtained by coagulation of the fluoropolymer aqueous dispersion of the invention.

The present invention is a fluoropolymer molding which is obtained by carrying out a molding/processing using the fluoropolymer aqueous dispersion or the fluoropolymer powder.

In the following, the present invention is described in detail.

The method of producing a fluoropolymer aqueous dispersion according to the invention comprises carrying out a concentration treatment of a pretreatment fluoropolymer aqueous dispersion.

The pretreatment fluoropolymer aqueous dispersion is obtained by carrying out a polymerization in an aqueous medium in the presence of a fluorine-containing surfactant (A).

The fluorine-containing surfactant (A) is a fluorine-containing surfactant having an octanol/water partition coefficient of 1.5 to 3.5.

The octanol/water partition coefficient is preferably not higher than 3.0, more preferably not higher than 2.8, from the viewpoint that the surfactant can be readily removed from the fluoropolymer aqueous dispersion.

The octanol/water partition coefficient is the coefficient of partition between 1-octanol and water and is expressed in terms of log P [wherein P represents the ratio between the fluorine-containing surfactant (A) concentration in octanol/fluorine-containing surfactant (A) concentration in water as found upon phase separation of a fluorine-containing surfactant (A)-containing octanol/water mixture (1:1)]. The octanol/water partition coefficient is determined by the measurement method according to OECD Guideline 107. In measuring the octanol/water partition coefficient, such methods as the flask shaking method and reversed-phase high performance liquid chromatography can generally be employed. The log P value so referred to herein is the value determined in the following manner: standard substances each having a known octanol/water partition coefficient are subjected to HPLC under predetermined conditions, the elution times thereof are measured, a working curve is constructed which shows the relation between the elution time and known octanol/water partition coefficient, and the elution time for the sample liquid as found in HPLC under the same conditions is compared with the working curve.

The above-mentioned polymerization may also be carried out in the presence of two or more species of the above-mentioned fluorine-containing surfactant (A).

When the polymerization is carried out in the presence of two or more species of the fluorine-containing surfactant (A), one or more of the fluorine-containing surfactant (A) species may singly or individually have an octanol/water partition coefficient outside the range given above provided that the value of $\Sigma(\log P*Wp)$ [Wp in the formula representing the weight fraction of each fluorine-containing surfactant (A) species relative to the total weight of the two or more fluorine-containing surfactant (A) species] is within the above range. Preferably, however, each individual of those species has an octanol/water partition coefficient within the above range.

The fluorine-containing surfactant (A) mentioned above is preferably an anionic surfactant.

Preferably, the above-mentioned anionic surfactant is a carboxylic acid-based surfactant or a sulfonic acid-based surfactant, for instance. As such surfactants, there may be mentioned those comprising a perfluorocarboxlic acid (I) represented by the general formula (1) given below, an ω-hydroperfluorocarboxylic acid (II) represented by the general formula (2) given below, a perfluoropolyethercarboxylic acid (III) represented by the general formula (3) given below, a perfluoroalkylalkylenecarboxylic acid (IV) represented by the general formula (4) given below, a perfluoroalkoxyfluorocarboxylic acid (V) represented by the general formula (5) given below, a perfluoroalkylsulfonic acid (VI) represented by the general formula (6) given below and/or a perfluoroalkylalkylenesulfonic acid (VII) represented by the general formula (7) given below.

The above-mentioned anionic surfactant may comprise one or more genera selected from among the above-mentioned compound genera (I) to (VII), and each compound genus of the above-mentioned (I) to (VII) may comprise one or more species.

The perfluorocarboxylic acid (I) is represented by the general formula (1):

$$F(CF_2)_{n1}COOM \qquad (1)$$

wherein n1 is an integer of 3 to 6 and M is H, $NH_4$ or an alkali metal.

In the above general formula (1), a preferred lower limit to the integer n1 is 4 from the viewpoint of stability of the polymerization reaction. Preferred as the moiety M is $NH_4$ from the viewpoint that the surfactant hardly remains in the resin upon processing of the fluoropolymer aqueous dispersion obtained.

Preferred as the perfluorocarboxylic acid (I) are, for example, $F(CF_2)_6COOM$, $F(CF_2)_5COOM$ and $F(CF_2)_4COOM$ (M in each formula being as defined above).

The ω-hydroperfluorocarboxylic acid (II) is represented by the general formula (2):

$$H(CF_2)_{n2}COOM \qquad (2)$$

wherein n2 is an integer of 4 to 8 and M is as defined above.

In the above general formula (2), a preferred upper limit to the integer n2 is 6 from the viewpoint of stability of the polymerization reaction. Preferred as the moiety M is $NH_4$ from the viewpoint that the surfactant hardly remains in the resin upon processing of the fluoropolymer aqueous dispersion obtained.

Preferred as the ω-hydroperfluorocarboxylic acid (II) are, for example, $H(CF_2)_8COOM$, $H(CF_2)_7COOM$, $H(CF_2)_6COOM$, $H(CF_2)_5COOM$ and $H(CF_2)_4COOM$ (M in each formula being as defined above).

The perfluoropolyethercarboxylic acid (III) is represented by the general formula (3):

$$Rf^1\!-\!O\!-\!(CF(CF_3)CF_2O)_{n3}CF(CF_3)COOM \qquad (3)$$

wherein $Rf^1$ is a perfluoroalkyl group containing 1 to 5 carbon atoms, n3 is an integer of 0 to 3 and M is as defined above.

From the viewpoint of stability in the step of polymerization, the group $Rf^1$ in the above general formula (3) is preferably a perfluoroalkyl group containing not more than 4 carbon atoms and n3 is preferably 0 or 1. Preferred as the moiety M is $NH_4$ from the viewpoint that the surfactant hardly remains in the resin upon processing of the fluoropolymer aqueous dispersion obtained.

Preferred as the perfluoropolyethercarboxylic acid (III) are, for example, $C_4F_9OCF(CF_3)COOM$, $C_3F_7OCF(CF_3)COOM$, $C_2F_5OCF(CF_3)COOM$, $CF_3OCF(CF_3)COOM$ and $CF_3OCF(CF_3)CF_2OCF(CF_3)COOM$ (M in each formula being as defined above). More preferred are $CF_3OCF(CF_3)COOM$ and $CF_3OCF(CF_3)CF_2OCF(CF_3)COOM$ (M in each formula being as defined above), among others, in view of their good stability in the step of polymerization and their good removability.

The perfluoroalkylalkylenecarboxylic acid (IV) is represented by the general formula (4):

$$Rf^2(CH_2)_{n4}Rf^3COOM \qquad (4)$$

wherein $Rf^2$ is a perfluoroalkyl group containing 1 to 5 carbon atoms, $Rf^3$ is a straight or branched perfluoroalkylene group containing 1 to 3 carbon atoms, n4 is an integer of 1 to 3 and M is as defined above.

In the above general formula (4), the group $Rf^2$ is preferably a perfluoroalkyl group containing at least 2 carbon atoms or a perfluoroalkyl group containing at most 4 carbon atoms. The group $Rf^3$ is preferably a perfluoroalkylene group containing 1 or 2 carbon atoms, more preferably $-(CF_2)-$ or $-CF(CF_3)-$. The integer n4 is preferably 1 or 2, more preferably 1. Preferred as the moiety M is $NH_4$ from the viewpoint that the surfactant hardly remains in the resin upon processing of the fluoropolymer aqueous dispersion obtained.

Preferred as the perfluoroalkylalkylenecarboxylic acid (IV) are, for example, $C_4F_9CH_2CF_2COOM$, $C_3F_7CH_2CF_2COOM$, $C_2F_5CH_2CF_2COOM$, $C_4F_9CH_2CF(CF_3)COOM$, $C_3F_7CH_2CF(CF_3)COOM$, $C_2F_5CH_2CF(CF_3)COOM$, $C_4F_9CH_2CH_2CF_2COOM$, $C_3F_7CH_2CH_2CF_2COOM$ and $C_2F_5CH_2CH_2CF_2COOM$ (M in each formula being as defined above).

The perfluoroalkoxyfluorocarboxylic acid (V) is represented by the general formula (5):

$$Rf^4\!-\!O\!-\!CY^1Y^2CF_2\!-\!COOM \qquad (5)$$

wherein $Rf^4$ is perfluoroalkyl group containing 1 to 5 carbon atoms, $Y^1$ and $Y^2$ are the same or different and each is H or F and M is as defined above.

In the above general formula (5), $Rf^4$ is preferably a perfluoroalkyl group containing 1 to 3 carbon atoms, more preferably a perfluoroalkyl group containing 3 carbon atoms, from the polymerization stability viewpoint. Preferred as the moiety M is $NH_4$ from the viewpoint that the surfactant hardly remains in the resin upon processing of the fluoropolymer aqueous dispersion obtained.

Preferred as the perfluoroalkoxyfluorocarboxylic acid (V) are $C_3F_7OCH_2CF_2COOM$, $C_3F_7OCHFCF_2COOM$ and $C_3F_7OCF_2CF_2COOM$ (M in each formula being as defined above), among others.

The perfluoroalkylsulfonic acid (VI) is represented by the general formula (6):

$$F(CF_2)_{n5}SO_3M \qquad (6)$$

wherein n5 is an integer of 3 to 6 and M is as defined above.

In the above general formula (6), the integer n5 is preferably an integer of 4 or 5 from the polymerization stability viewpoint. Preferred as the moiety M is $NH_4$ from the viewpoint that the surfactant hardly remains in the resin upon processing of the fluoropolymer aqueous dispersion obtained.

Preferred as the perfluoroalkylsulfonic acid (VI) are, for example, $F(CF_2)_5SO_3M$ and $F(CF_2)_5SO_3M$ (M in each formula being as defined above).

The perfluoroalkylalkylenesulfonic acid (VII) is represented by the general formula (7):

$$Rf^5(CH_2)_{n6}SO_3M \qquad (7)$$

wherein $Rf^5$ is a perfluoroalkyl group containing 1 to 5 carbon atoms, n6 is an integer of 1 to 3 and M is as defined above.

In the above general formula (7), $Rf^5$ is preferably a perfluoroalkyl group containing 1 to 3 carbon atoms, more preferably a perfluoroalkyl group containing 3 carbon atoms. The integer n6 is preferably 1 or 2, more preferably 1. Preferred as the moiety M is $NH_4$ from the viewpoint that the surfactant hardly remains in the resin upon processing of the fluoropolymer aqueous dispersion obtained.

Preferred as the perfluoroalkylalkylenesulfonic acid (VII) are, for example, $$C_3F_7CH_2SO_3M$$

(M being as defined above) and the like.

In view of their little tendency to remain in the resin upon processing under heating, carboxylic acid-based surfactants are preferred as the fluorine-containing surfactant (A). More preferred are those comprising a perfluorocarboxylic acid (I), an ω-hydroperfluorocarboxylic acid (II), perfluoropolyethercarboxylic acid (III), perfluoroalkylalkylenecarboxylic acid (IV) and/or perfluoroalkoxyfluorocarboxylic acid (V). Still more preferred are those comprising a perfluorocarboxylic acid (I), ω-hydroperfluorocarboxylic acid (II) and/or perfluoropolyethercarboxylic acid (III). Particularly preferred, among others, are $NH_4$ salts of these.

Particularly preferred as the fluorine-containing surfactant (A) are those comprising $F(CF_2)_6COOM$, $F(CF_2)_5COOM$, $F(CF_2)_4COOM$, $H(CF_2)_8COOM$, $H(CF_2)_7COOM$, $H(CF_2)_6COOM$, $H(CF_2)_5COOM$, $H(CF_2)_4COOM$, $C_4F_9OCF(CF_3)COOM$, $C_3F_7OCF(CF_3)COOM$, $C_2F_5OCF(CF_3)COOM$, $CF_3OCF(CF_3)COOM$, $CF_3OCF(CF_3)CF_2OCF(CF_3)COOM$, $C_4F_9CH_2CF_2COOM$, $C_3F_7CH_2CF_2COOM$, $C_2F_5CH_2CF(CF_3)COOM$, $C_3F_7OCH_2CF_2COOM$, $C_3F_7OCHFCF_2COOM$ and/or $C_3F_7OCF_2CF_2COOM$ (M in each formula being as defined above). Among them, the $NH_4$ salt form of each of these is preferred from the viewpoint that the surfactant hardly remains in resin upon processing of the fluoropolymer aqueous dispersion obtained.

Most preferred as the fluorine-containing surfactant (A) from the polymerization stability and removal efficiency viewpoint are those comprising $F(CF_2)_6COOM$, $F(CF_2)_5COOM$, $F(CF_2)_4COOM$, $H(CF_2)_6COOM$, $C_4F_9OCF(CF_3)COOM$, $C_3F_7OCF(CF_3)COOM$, $C_2F_5OCF(CF_3)COOM$, $CF_3OCF(CF_3)CF_2OCF(CF_3)COOM$, $C_4F_9CH_2CF_2COOM$, $C_3F_7CH_2CF_2COOM$, $C_2F_5CH_2CF(CF_3)COOM$, $C_3F_7OCH_2CF_2OOM$, $C_3F_7OCHFCF_2COOM$ and/or $C_3F_7OCF_2CF_2COOM$ (M in each formula being as defined above). Among them, the $NH_4$ salt form of each of these is preferred from the viewpoint that the surfactant hardly remains in resin upon processing of the fluoropolymer aqueous dispersion obtained.

The above-mentioned polymerization comprises carrying out the polymerization of a fluorine-containing monomer or monomers in an aqueous medium in the presence of the fluorine-containing surfactant (A) to give a fluoropolymer.

The "aqueous medium" is not particularly restricted but may be not only water but also one comprising, in addition to water, a fluorine-free organic solvent such as an alcohol, ether, ketone or a paraffin wax and/or a fluorine-containing organic solvent.

The "fluorine-containing monomer" is a monomer containing at least one fluorine atom bound to a carbon atom. The "fluorine-containing monomer" is not particularly restricted.

The fluorine-containing monomer may, for example, be a fluoroolefin, fluorinated cyclic monomer or fluorinated alkyl vinyl ether.

As the fluoroolefin, there may be mentioned, for example, fluorine-containing ethylenic compounds represented by the general formula (8):

$$CF_2\!=\!CZ^1Z^2 \qquad (8)$$

wherein $Z^1$ is F, Cl, H or $—CF_3$ and $Z^2$ is F, Cl, H or $Rf^6$ and $Rf^6$ is a perfluoroalkyl group containing 1 to 10 carbon atoms, or by the general formula (9):

$$CF_2\!=\!CZ^3Z^4 \qquad (9)$$

wherein $Z^3$ is F, H, an alkyl group containing 1 to 6 carbon atoms or a perfluoroalkyl group containing 1 to 10 carbon atoms and $Z^4$ is H, Cl, an alkyl group containing 1 to 6 carbon atoms or $—(CF_2)_{n7}-Z^5$ in which n7 is an integer of 1 to 10 and $Z^5$ is F or H.

Preferred as the fluoroolefin are, for example, tetrafluoroethylene [TFE], hexafluoropropylene [HFP], vinyl fluoride, vinylidene fluoride [VDF], trifluoroethylene, chlorotrifluoroethylene, hexafluoroisobutylene, perfluorobutylethylene, perfluoro-n-1-hexene and like ones containing 2 to 6 carbon atoms.

More preferred as the fluoroolefin are $CH_2\!=\!CHF$, $CH_2\!=\!CFCF_3$, $CH_2\!=\!CHCF_3$, $CH_2\!=\!C(CF_3)_2$, $CH_2\!=\!CHC_4F_9$, $CH_2\!=\!CF(CF_2)_3\!-\!H$, etc.

Preferred as the fluorinated cyclic monomer are perfluoro-2,2-dimethyl-1,3-dioxole [PDD], perfluoro-2-methylene-4-methyl-1,3-dioxolane [PMD] and the like.

The fluorinated alkyl vinyl ether includes, among others, those represented by $$CY^3Y^4\!=\!CY^5\!-\!(OR^1)_{n8}\!-\!OR^2$$

wherein $Y^3$, $Y^4$ and $Y^5$ are the same or different and each represents H or F, $R^1$ is an alkylene group containing 1 to 8 carbon atoms, with its hydrogen atom or atoms being optionally substituted by fluorine, $R^2$ is an alkyl group containing 1 to 8 carbon atoms, with its hydrogen atom or atoms being optionally substituted by fluorine and n8 is 0 or 1.

The fluorinated alkyl vinyl ether may be one having a branched chain-containing ether structure represented by $—CF_2CF(CF_3)—O—$, for example $CF_2\!=\!CFO\!-\!CF_2CF(CF_3)\!-\!O\!-\!C_3F_7$.

Preferred as the fluorinated alkyl vinyl ether are perfluoro (alkyl vinyl ether) species. Preferred as the perfluoro(alkyl vinyl ether) species are, for example, perfluoro(methyl vinyl ether) [PMVE], perfluoro(ethyl vinyl ether) [PEVE], perfluoro(propyl vinyl ether) [PPVE] and perfluoro(butyl vinyl ether).

A perfluoromonomer is preferred as the fluorine-containing monomer since the fluoropolymer obtained therefrom, namely a perfluoropolymer, is excellent in thermal stability and other physical properties and the handling thereof becomes easy.

The perfluoromonomer is preferably a perfluoroolefin, and tetrafluoroethylene [TFE] is preferred as the perfluoroolefin.

The above-mentioned polymerization may also comprise carrying out the polymerization of a fluorine-containing monomer(s) together with a fluorine-free monomer(s).

The fluorine-free monomer is not particularly restricted but may be any of those copolymerizable with the fluorine-containing monomer(s). Thus, it may be, for example, a hydrocarbon monomer. The hydrocarbon monomer may be one having a non-fluorine halogen atom(s), such an element as oxygen or nitrogen, or one or more various substituents, for instance.

As the hydrocarbon monomer, there may be mentioned, for example, alkenes, alkyl vinyl ethers, vinyl esters, alkyl allyl ethers and alkyl allyl esters.

As the substituent, there may be mentioned, for example, hydroxyl, carboxyl, cyano, glycidyl, amino, amido, and aromatic substituents.

The above polymerization is carried out generally by adding a polymerization initiator in addition to the fluorine-containing surfactant (A) and the fluorine-containing monomer(s), optionally together with the fluorine-free monomer(s).

The polymerization initiator is not particularly restricted but may be any of those capable of radical generation in the above polymerization. Thus, it includes dibasic acid peroxides, azobisisobutylamidine dihydrochloride and other known oil-soluble polymerization initiators, ammonium persulfate and other persulfates, which are water-soluble polymerization initiators, and/or redox systems resulting from combined use of a reducing agent with any of the above-mentioned oil-soluble polymerization initiators and/or water-soluble polymerization initiators.

The polymerization initiator concentration can be properly selected according to the monomer species such as the fluorine-containing monomer(s) employed, the intended molecular weight of the fluoropolymer and the rate of reaction.

The above polymerization may also comprise adding one or more of such known additives as chain transfer agents and radical scavengers in addition to the fluorine-containing surfactant (A), monomers such as the fluorine-containing monomer(s) and the above-mentioned polymerization initiator.

As the chain transfer agents, there may be mentioned, for example, ethane, isopentane, n-hexane, cyclohexane, methanol, ethanol, tert-butanol, carbon tetrachloride, chloroform, methylene chloride, methyl chloride, and fluorocarbon iodides.

The level of addition of each additive can be adequately selected in the conventional manner. Each additive genus may comprise two or more species.

In the above polymerization, the reaction conditions such as polymerization temperature and polymerization pressure can be appropriately selected according to the method of polymerization, the monomer(s) such as the fluorine-containing monomer(s), the desired fluoropolymer species and so forth.

The polymerization temperature is generally −20° C. to 150° C., preferably 5 to 100° C., and the polymerization pressure is generally not higher than 10 MPa, preferably not higher than 5 MPa.

The level of addition of the fluorine-containing surfactant (A) can be properly selected according to the fluorine-containing monomer species added and other monomer species, if any, the molecular weight of the desired fluoropolymer and the size of production.

The level of addition of the fluorine-containing surfactant (A) is preferably 0.001 to 10% by mass relative to the aqueous medium. A more preferred upper limit to the level of addition of the fluorine-containing surfactant (A) is 5% by mass from the polymerization efficiency viewpoint, a still more preferred upper limit is 2% by mass from the concentration efficiency viewpoint, which is to be described later herein, and a particularly preferred upper limit is 1% by mass.

In the above polymerization, the level of addition of the fluorine-containing monomer(s) and optional other monomer species is properly determined according to the intended molecular weight of the fluoropolymer, the size of production, and other factors.

From the economy and productivity viewpoint, the monomer(s) is(are) preferably added in an amount of not smaller than 10% by mass relative to the aqueous medium and, from the little adhesion and reaction system stability viewpoint, among others, the addition level is preferably not higher than 150% by mass. A more preferred lower limit to the addition level is 20% by mass, a more preferred upper limit is 100% by mass and a still more preferred upper limit is 70% by mass.

The above-mentioned fluoropolymer is a polymer containing carbon-bound fluorine atoms.

The fluoropolymer may be, for example, a non-melt-processable fluoropolymer, melt-processable fluoropolymer or elastomeric copolymer.

As the non-melt-processable fluoropolymer, there may be mentioned TFE homopolymer and modified polytetrafluoroethylene [modified PTFE].

The term "modified PTFE" as used herein means a non-melt-processable copolymer of TFE and a minor constituent monomer(s) other than TFE.

As the minor constituent monomer, there may be mentioned, for example, perfluoroolefins, fluoro(alkyl vinyl ether) species, fluorinated cyclic monomers and perfluoro (alkylethylene) species.

In the modified PTFE, the minor constituent monomer-derived minor constituent monomer unit content relative to all the monomer units is generally within the range of 0.001 to 2 mole percent.

The "monomer unit" such as the above-mentioned minor constituent monomer unit is a part of the molecular structure of the fluoropolymer and is a part derived from the corresponding monomer. For example, the TFE unit is a part of the molecular structure of the fluoropolymer and is a unit derived from TFE and is represented by —(CF$_2$CF$_2$)—. The "all monomer units" mentioned above includes all monomer-derived parts constituting the molecular structure of the fluoropolymer.

The term "minor constituent monomer unit content (mole percent) relative to all the monomer units" as used herein means the mole fraction (mole percent) of the minor constituent monomer(s) from which the minor constituent monomer unit(s) is(are) derived relative to the monomers from which the above-mentioned "all monomer units" are derived, namely the total amount of the monomers constituting the fluoropolymer.

As the melt-processable fluoropolymer, there may be mentioned, for example, ethylene/TFE copolymer [ETFE], TFE/HFP copolymer [FEP], TFE/perfluoro(alkyl vinyl ether) copolymer [TFE/PFVE copolymer], polyvinylidene fluoride [PVDF] and polyvinyl fluoride [PVF].

As the TFE/PFVE copolymers, there may be mentioned TFE/PMVE copolymer [MFA], TFE/PEVE copolymer and TFE/PPVE copolymer [PFA]. Among them, MFA and PFA are preferred, and PFA is more preferred.

The PFA preferably has a composition ratio of 95 to 99.7 mole percent TFE:0.3 to 5.0 mole percent PPVE.

As the elastomeric copolymer, there may be mentioned TFE/propylene copolymer, HFP/ethylene copolymer, HFP/ethylene/TFE copolymer and VDF-based polymer.

Among them, VDF-based polymer is readily obtained by polymerization, hence is preferred.

As the VDF-based polymers, there may be mentioned PVDF, VDF/HFP copolymers, HFP/ethylene copolymers and VDF/TFE/HFP copolymers, among others.

When the elastomeric copolymer is a TFE-based one, for instance, it is preferably a copolymer having a TFE monomer unit content of 40 to 85 mole percent, for instance.

From the good thermal stability and easy moldability/processability viewpoint, the fluoropolymer is preferably a perfluoropolymer.

Preferred as the perfluoropolymer are TFE homopolymer, modified polytetrafluoroethylene, FEP, MFA, TFE/PEVE copolymer and PFA, and TFE homopolymer and/or modified polytetrafluoroethylene are more preferred.

The fluoropolymer can be adjusted to the desired average primary particle diameter, number average molecular weight, composition and physical properties by properly selecting the polymerization reaction conditions and monomer addition level and other factors The average primary particle diameter can generally be adjusted to about 0.01 to 1 µm, preferably 0.01 to 0.7 µm.

The "average primary particle diameter" means the average particle diameter of the fluoropolymer particles in the fluoropolymer aqueous dispersion as obtained by polymerization and not yet subjected to such a operation as dilution or concentration after the polymerization reaction.

The average primary particle diameter, so referred to herein, is the value indirectly determined in the following manner. Using fluoropolymer aqueous dispersions adjusted to a predetermined solid concentration, a working curve showing the relation between the transmittance, per unit length, of incident light at 550 nm and the average particle diameter determined by electron photomicrography is constructed, and the transmittance of the fluoropolymer aqueous dispersion, which is the measurement target, is measured in the same manner as mentioned above for comparison with the working curve.

In the case of non-melt-processable fluoropolymers, the number average molecular weight can be adjusted to about 200 to about 2000×10⁴ on the standard specific gravity [SSG] basis and, in the case of melt-processable fluoropolymers and elastomeric copolymers, it can be adjusted generally to 2000 to 1000000, preferably to 5000 to 750000, more preferably to 10000 to 500000 as expressed in terms of the polystyrene equivalent value determined by gel permeation chromatography [GPC] when the polymer is a solvent-soluble one or on the melt flow rate value basis when the polymer is one insoluble in any solvent.

The melt flow rate value (measured under a load of 7 kg; the measurement temperature varying according to the fluoropolymer species) can be adjusted to $0.01 \times 10^{-2}$ to $50 \times 10^{-2}$ (ml/second), preferably $0.05 \times 10^{-2}$ to $25 \times 10^{-2}$ (ml/second), more preferably $0.1 \times 10^{-2}$ to $10 \times 10^{-2}$ (ml/second).

The pretreatment fluoropolymer aqueous dispersion is one obtained by carrying out a polymerization in an aqueous medium in the presence of the fluorine-containing surfactant (A) and is an aqueous dispersion as just obtained by polymerization and not yet subjected to dispersion stabilization or any other post-treatment.

The pretreatment fluoropolymer aqueous dispersion contains the particle comprising the fluoropolymer dispersed, in the presence of the fluorine-containing surfactant (A) used in the above polymerization, in the aqueous medium having served as the reaction medium in the above polymerization and may further comprise one or more of known additives such as dispersion stabilizers other than the fluorine-containing surfactant (A).

The fluoropolymer concentration in the pretreatment fluoropolymer aqueous dispersion is not particularly restricted but generally is 10 to 40% by mass when the pretreatment fluoropolymer aqueous dispersion is an aqueous dispersion obtained just after polymerization.

From the concentration efficiency viewpoint, the above-mentioned fluoropolymer concentration is preferably not lower than 20% by mass but not higher than 30% by mass.

The method of producing a fluoropolymer aqueous dispersion according to the invention comprises carrying out the concentration treatment comprising concentration operation of the pretreatment fluoropolymer aqueous dispersion.

The concentration treatment is generally carried out after subjecting the pretreatment fluoropolymer aqueous dispersion to such post-treatment as dispersion stabilization.

As the concentration operation, there may be mentioned, for example, ultrafiltration concentration, ion exchange concentration, phase separation concentration, and electric concentration.

The ultrafiltration concentration, ion exchange concentration, phase separation concentration and electric concentration can respectively be carried out in the conventional manner under those conditions which are known in the art. On this occasion, a nonionic surfactant is preferably added to the pretreatment fluoropolymer aqueous dispersion in an amount of 0.1 to 50% by mass, more preferably not greater than 20% by mass, relative to the solid matter in the pretreatment fluoropolymer aqueous dispersion for the purpose of dispersion stabilization of the fluoropolymer.

Among the concentration operations mentioned above, the phase separation concentration and/or electric concentration method is preferred, and the phase separation concentration method is more preferred, from the viewpoint that the fluorine-containing surfactant can be removed efficiently. The phase separation concentration can be effected, for example, by adding a nonionic surfactant or the like to the pretreatment fluoropolymer aqueous dispersion, adjusting the pH to 9 to 11, adjusting the fluoropolymer concentration to 20 to 30% by mass by adding water or the like, and gently stirring the resulting mixture and then allowing the same to stand.

Preferred as the nonionic surfactant are polyoxyalkylene alkyl ether-based nonionic surfactants represented by the general formula (i):

wherein R³ is a straight or branched, primary or secondary alkyl group containing 8 to 18 carbon atoms and A¹ is a polyoxyalkylene group constituted of an oxyethylene/oxypropylene copolymer chain or an oxyalkylene group, and/or polyoxyethylene alkylphenyl ether-based nonionic surfactants represented by the general formula (ii):

wherein R⁴ is a straight or branched alkyl group containing 4 to 12 carbon atoms and A² is a polyoxyalkylene chain.

The level of addition of the nonionic surfactant is preferably 5 to 50% by mass relative to the solid matter in the pretreatment fluoropolymer aqueous dispersion.

The above-mentioned concentration operation may be carried out either once or repeatedly two or more times.

The phrase "carrying out the concentration operation 'once'", when so referred to herein, means that the whole amount of the pretreatment fluoropolymer aqueous dispersion prior to the concentration treatment is subjected to the concentration operation. For example, when the volume of the pretreatment fluoropolymer aqueous dispersion prior to the concentration treatment is $x^1$ liters, the operation for subjecting the whole $x^1$-liter amount to the concentration operation as the primary concentration target is the first concentration operation, and the operation for subjecting, to the concentration operation, the whole amount ($x^2$ liters) of the secondary concentration target obtained by that first concentration operation, if necessary after supplementation with water and/or a surfactant, for instance, to make the whole amount $x^2$ liters, is the second concentration operation. Similarly, the n-th concentration target ($x^n$ liters) is derived from the $x^1$ liters of the primary concentration target and, in this respect, the n-th concentration operation is regarded as "subjecting the whole amount of the pretreatment fluoropolymer aqueous dispersion prior to the concentration treatment to the concentration operation".

As far as the first concentration operation is concerned in which the target for concentration is the above-mentioned "pretreatment fluoropolymer aqueous dispersion prior to the concentration treatment" not yet subjected to the concentration treatment at all, the above-mentioned "whole amount of the pretreatment fluoropolymer aqueous dispersion prior to the concentration treatment" is the very "whole amount of the pretreatment fluoropolymer aqueous dispersion", namely the above-mentioned $x^1$-liter primary concentration target. As for the n-th concentration operation for further concentrating the concentrate obtained by the (n-1)th concentration operation as the target for concentration, the above-mentioned "whole amount" is the amount of that concentrate, if necessary after supplementation with water and/or a surfactant, for instance, namely the above-mentioned $x^n$-liter amount of the n-th concentration target.

In carrying out two or more concentration operations, one and the same concentration method may be repeated or two or more concentration methods may be combined. The operations according to the above-mentioned ultrafiltration concentration method, ion exchange concentration method and electric concentration method may be carried out continuously.

Since, however, in accordance with the method of producing a fluoropolymer aqueous dispersion according to the invention, the pretreatment fluoropolymer aqueous dispersion is obtained by carrying out the polymerization in an aqueous medium in the presence of the fluorine-containing surfactant (A), the efficiency in removing the fluorine-containing surfactant (A) is very high and, therefore, the fluorine-containing surfactant (A) can generally be removed very efficiently by carrying out the above-mentioned concentration operation only once.

The method of producing a fluoropolymer aqueous dispersion according to the invention can make it possible for the ratio [$M^1/M^0$] between the mass [$M^0$] of the fluorine-containing surfactant (A) in the pretreatment fluoropolymer aqueous dispersion and the mass [$M^1$] of the fluorine-containing surfactant (A) removed by carrying out the concentration operation once to preferably arrive at 0.5 or above. The lower limit to the above [$M^1/M^0$] value may be more preferably set at 0.6, still more preferably 0.7, particularly preferably 0.8, for the purpose of improving the efficiency in removing the fluorine-containing surfactant (A). From the fluoropolymer stability and/or economy viewpoint, a more preferred upper limit to the [$M^1/M^0$] value is 0.99, a still more preferred upper limit is 0.95, and a particularly preferred upper limit is 0.90.

An [$M^1/M^0$] value within the above range can preferably be attained with ease in the first concentration operation.

That portion of the fluorine-containing surfactant (A) separated by the above concentration operation can be recovered, purified and reused by any methods known in the art.

Since the pretreatment fluoropolymer aqueous dispersion is obtained by carrying out the polymerization in an aqueous medium in the presence of the fluorine-containing surfactant (A) and the fluorine-containing surfactant (A) can be readily removed by carrying out the above-mentioned concentration operation, the method of producing a fluoropolymer aqueous dispersion according to the invention can reduce the concentration of the fluorine-containing surfactant (A) in the fluoropolymer aqueous dispersion obtained to 5% by mass or below.

The concentration of the fluorine-containing surfactant (A) is preferably not lower than 0.1 ppm from the fluoropolymer dispersion stability viewpoint and preferably not higher than 1% by mass, more preferably not higher than 0.1% by mass, still more preferably not higher than 500 ppm, from the processing treatment viewpoint, among others.

When the concentration of the fluorine-containing surfactant (A) in the fluoropolymer aqueous dispersion is not higher than 500 ppm, the physical properties of the polymer are generally insusceptible to the influences of the fluorine-containing surfactant (A) in the step of molding/processing, among others, and, therefore, the dispersion serves as a particularly excellent raw material for manufacturing a fluoropolymer powder, a fluoropolymer molding and so forth.

The method of producing a fluoropolymer aqueous dispersion according to the invention, according to which the pretreatment fluoropolymer aqueous dispersion is obtained by carrying out the polymerization in an aqueous medium in the presence of the fluorine-containing surfactant (A) with which high fluoropolymer yields can be obtained, makes it possible to attain a fluoropolymer concentration of about 20% by mass or above. The method of producing a fluoropolymer aqueous dispersion according to the invention, according to which the pretreatment fluoropolymer aqueous dispersion having such a high fluoropolymer concentration as mentioned above is subjected to the above-mentioned concentration treatment, makes it possible for the fluoropolymer aqueous dispersion obtained to have a solid matter concentration of 30 to 80% by mass.

From the viewpoint of transportation economy and/or processability in impregnation or coating, for instance, a preferred lower limit to the above-mentioned solid matter concentration is 35% by mass, a more preferred lower limit is 40% by mass, and a preferred upper limit to the solid matter concentration is 75% by mass and a more preferred upper limit is 70% by mass.

The solid matter concentration, so referred to herein, is determined from the mass loss determined after 1 hour of drying of the fluoropolymer aqueous dispersion in question at 380° C.

The fluoropolymer aqueous dispersion obtained by the above-mentioned method of producing a fluoropolymer aqueous dispersion according to the invention also constitutes an aspect of the present invention.

The fluoropolymer aqueous dispersion obtained by the above-mentioned method of producing a fluoropolymer aqueous dispersion according to the invention preferably contains the fluorine-containing surfactant (A) at a level not smaller than 0.1 ppm but not greater than 5% by mass and has a solid matter concentration of 30 to 80% by mass.

The fluoropolymer aqueous dispersion obtained by the above-mentioned method of producing a fluoropolymer aqueous dispersion is low in fluorine-containing surfactant (A) content and high in solid matter concentration, as mentioned above, and therefore is an excellent material for the production of fluoropolymer powders, fluoropolymer moldings and so forth. It is also excellent in the dispersion stability of particles comprising the fluoropolymer.

The term "fluoropolymer aqueous dispersion" as used herein without mentioning as to whether it is the one obtained by the above-mentioned method of producing fluoropolymer aqueous dispersion or not refers to any fluoropolymer aqueous dispersion without restriction to one obtained by the above-mentioned method of producing fluoropolymer aqueous dispersion.

The second fluoropolymer aqueous dispersion of the invention is a fluoropolymer aqueous dispersion containing a particle comprising a fluoropolymer dispersed in an aqueous medium, and the fluoropolymer aqueous dispersion contains a fluorine-containing surfactant (A) in an amount of not smaller than 0.1 ppm but not greater than 5% by mass and has a solid matter concentration of 30 to 80% by mass, wherein the fluorine-containing surfactant (A) has an octanol/water partition coefficient of 1.5 to 3.5.

The fluoropolymer and aqueous medium in the second fluoropolymer aqueous dispersion of the invention is the same as described hereinabove referring to the method of producing a fluoropolymer aqueous dispersion according to the invention.

The "particle comprising the fluoropolymer" mentioned above generally has an average primary particle diameter of 10 nm to 1 μm. The above-mentioned average primary particle diameter is preferably not smaller than 100 nm but not greater than 700 nm from the viewpoint of the ease of coagulation or like processing.

The second fluoropolymer aqueous dispersion of the invention is an aqueous dispersion just obtained by polymerization of a fluorine-containing monomer(s) in an aqueous medium. It may be the one not yet subjected to such treatment, or it may be a dispersion obtained by subjecting the aqueous dispersion just obtained by polymerization to such post-treatment as dispersion stabilization in the conventional manner.

The second fluoropolymer aqueous dispersion of the invention contains the fluorine-containing surfactant (A) at a concentration of not lower than 0.1 ppm but not higher than 5% by mass.

The fluorine-containing surfactant (A) is the same as the one described hereinabove referring to the method of producing a fluoropolymer aqueous dispersion according to the invention and is a fluorine-containing surfactant having an octanol/water partition coefficient of 1.5 to 3.5.

The octanol/water partition coefficient is preferably not higher than 3.0, more preferably not higher than 2.8, from the viewpoint of ready removability upon concentration treatment.

The concentration of the fluorine-containing surfactant (A) is preferably not higher than 1% by mass, more preferably not higher than 0.1% by mass, still more preferably not higher than 500 ppm, from the processing treatment viewpoint.

The second fluoropolymer aqueous dispersion of the invention may contain one or more of such fluorine-containing surfactant (A) species as mentioned above provided that the total concentration thereof is within the range specified hereinabove.

The second fluoropolymer aqueous dispersion of the invention may contain, in addition to the fluoropolymer and fluorine-containing surfactant (A), one or more of the additives known in the art, for example dispersion stabilizers other than the fluorine-containing surfactant (A), in the aqueous medium. As far as the dispersion stabilizer is concerned, however, one comprising the fluorine-containing surfactant (A) alone is preferred.

The second fluoropolymer aqueous dispersion of the invention has a solid matter concentration of 30 to 80% by mass.

For securing good processability in post-treatment such as coagulation and in molding of the aqueous dispersion as such, a preferred lower limit to the above-mentioned solid matter concentration is 35% by mass, a more preferred lower limit is 40% by mass, and a preferred upper limit to the above-mentioned solid matter concentration is 75% by mass and a more preferred upper limit is 70% by mass.

The method of producing the second fluoropolymer aqueous dispersion of the invention is not particularly restricted but said dispersion can be produced, for example, by (a) the method of producing the fluoropolymer aqueous dispersion which comprises carrying out the polymerization in an aqueous medium using a fluorine-containing surfactant (A) as an emulsifier, (b) the method of producing the fluoropolymer aqueous dispersion which comprises carrying out the polymerization in an aqueous medium using, as an emulsifier, a surfactant other than the fluorine-containing surfactant (A), or (c) the method comprising carrying out the polymerization in an aqueous medium using, as emulsifiers, a fluorine-containing surfactant (A) and a surfactant other than the fluorine-containing surfactant (A).

The above-mentioned method of producing a fluoropolymer aqueous dispersion according to the invention is preferred as the above-mentioned production methods (a) and (c).

The fluorine-containing surfactant (A) in the second fluoropolymer aqueous dispersion of the invention may be the one caused to be present in carrying out the polymerization in the aqueous medium for obtaining the fluoropolymer.

When the fluorine-containing surfactant (A) is the one caused to be present in the above-mentioned polymerization, the second fluoropolymer aqueous dispersion of the invention, when subjected to the above-mentioned concentration treatment, allows efficient elimination of the fluorine-containing surfactant (A) from the fluoropolymer aqueous dispersion. Therefore, even an aqueous dispersion having such a low fluorine-containing surfactant (A) concentration as falling within the range specified above can be prepared with ease.

When the fluorine-containing surfactant (A) is the one caused to be present in the above-mentioned polymerization, the fluoropolymer yield is good and the solid matter concentration can be within the above-mentioned range and, therefore, the second fluoropolymer aqueous dispersion of the invention can be prepared with ease. For example, the fluoropolymer aqueous dispersion just after polymerization as obtained by carrying out the polymerization by adding the fluorine-containing surfactant (A) in an ordinary amount of about 1% by mass relative to the aqueous medium has a solid matter concentration of about 20% by mass and, after such concentration treatment as mentioned above, it attains a solid matter concentration within the range given hereinabove; thus, the fluoropolymer aqueous dispersion of the invention can be prepared with ease. When the polymerization is carried out by adding the fluorine-containing surfactant (A) in such a large amount as about 10% by mass relative to the aqueous medium, the fluoropolymer aqueous dispersion obtained just after polymerization has a solid matter concentration of 25% or above and, when that concentration is 30% or above, the solid matter concentration is already within the range specified above without carrying out the above-mentioned concentration treatment. By carrying out the concentration treatment to remove the fluorine-containing surfactant (A), however, it is also possible to prepare the fluoropolymer aqueous dispersion of the invention. In accordance with the present invention, the fluoropolymer aqueous dispersion just after polymerization can readily have a solid matter concentration of 30% by mass or above.

The second fluoropolymer aqueous dispersion of the invention contains an amount not smaller than 0.1 ppm but not larger than 5% by mass of the fluorine-containing surfactant (A) and has a solid matter concentration of 30 to 80% by mass and, therefore, is an excellent material for the production of a fluoropolymer powder and a fluoropolymer molding since the post-treatment such as coagulation or the molding/processing using the aqueous dispersion as such can be carried out efficiently without any impairment in dispersion stability; the fluoropolymer moldings obtained can have good physical properties.

The fluoropolymer powder of the invention is obtained by drying a wet powder obtained by coagulation of the fluoropolymer aqueous dispersion obtained by the method of producing a fluoropolymer aqueous dispersion according to the invention or the second fluoropolymer aqueous dispersion (hereinafter both the "fluoropolymer aqueous dispersions" are collectively referred to simply as "fluoropolymer aqueous dispersion of the invention").

The coagulation is generally carried out by diluting the fluoropolymer aqueous dispersion of the invention with water to a fluoropolymer concentration of 10 to 20% by mass, optionally adjusting the pH to neutrality or alkalinity, and stirring more vigorously than during polymerization in a vessel equipped with a stirrer.

The above coagulation may also be carried out while adding, as a coagulant, a water-soluble organic compound such as methanol or acetone, an inorganic salt such as potassium nitrate or ammonium carbonate, or an inorganic acid such as hydrochloric acid, sulfuric acid or nitric acid.

A pigment- and/or filler-containing fluoropolymer fine powder with a pigment(s) and/or filler(s) uniformly mingled therein can also be obtained by adding, for co-coagulation, a pigment for coloration and/or one or more of various fillers for improving mechanical properties before or during coagulation.

The above coagulation may be carried out continuously using in-line mixers, for instance.

The drying of the wet powder obtained by the above coagulation is generally carried out by such means as vacuum, high frequency irradiation or hot air while maintaining a state in which the wet powder is not caused to flow excessively, preferably in a state of standing still.

The above drying is carried out at a drying temperature of 10 to 250° C., preferably 100 to 200° C.

When the above-mentioned wet powder or the fluoropolymer powder obtained by drying the wet powder is a fine powder of a TFE homopolymer and/or a modified PTFE as obtained by emulsion polymerization, friction among powder particles, in particular at elevated temperatures, is generally unfavorable since a weak shearing force can readily fibrillate the fluoropolymer particles; upon fibrillation, the particles lose their original stable particle structure.

The fluoropolymer powder of the invention generally has an average particle diameter of 50 µm to 1000 µm. A preferred lower limit to the average particle diameter is 100 µm from the moldability/processability viewpoint, among others, and a preferred upper limit is 700 µm.

The average particle diameter of the fluoropolymer powder, so referred to herein, is the value measured by means of a scanning electron microscope.

The fluoropolymer powder of the invention, which is obtained from the fluoropolymer aqueous dispersion of the invention, shows good moldability/processability and is useful as a raw material for producing a fluoropolymer molding excellent in mechanical characteristics and other physical properties.

The fluoropolymer powder of the invention is preferably used for molding purposes, in particular, and suitable fields of application thereof include tubes and the like for use in hydraulic systems and fuel systems in aircrafts, automobiles and the like, flexible hoses for liquid chemicals, steam and the like, and electric wire coverings, among others.

The fluoropolymer molding of the invention is obtained by carrying out a molding/processing using the above-mentioned fluoropolymer aqueous dispersion of the invention or the fluoropolymer powder of the invention.

The "molding/processing", so referred to herein, includes production of pellets, production of moldings, coating processing and/or cast film formation.

The fluoropolymer moldings of the invention may be in the form of pellets, molded articles, coatings, or cast films or membranes.

The above molding/processing can be properly carried out by one of the methods known in the art.

Among the molding/processing methods, the method of producing pellets is not particularly restricted but may be, for example, the method comprising feeding the fluoropolymer powder of the invention to a kneader or extruder, followed by melting and kneading to produce pellets.

The method of producing molded articles is not particularly restricted but may include, among others, compression molding, extrusion molding, paste extrusion moldings, and injection molding.

The coating processing method is not particularly restricted but may be any of the methods of forming coat films of the fluoropolymer on substrates or articles to be coated. For example, mention may be made of the method comprising applying a powder coating composition comprising the above-mentioned fluoropolymer powder or the fluoropolymer aqueous dispersion of the invention to articles to be coated, and the method comprising impregnating porous bodies with the fluoropolymer aqueous dispersion of the invention, followed by drying and sintering. The method of application is not particularly restricted but includes, among others, spray coating, dip coating, brush-on coating, and electrostatic coating.

In the above coating processing, a composition obtained by adding a nonionic surfactant to the fluoropolymer aqueous dispersion of the invention prior to application to thereby stabilize the fluoropolymer aqueous dispersion, followed by further concentration and addition of an organic or inorganic filler(s) according to the intended use can be applied. Such composition, when applied to metal or ceramic substrates, can give coat surfaces having nonstickiness and a low coefficient of friction and excellent in gloss, smoothness, wear resistance, weather resistance and thermal stability. It is thus suited for coating rolls, cooking utensils and the like and for impregnation treatment of glass cloths, among others.

As for the method of cast film formation, there may be mentioned, for example, the method comprising applying the dispersion to a substrate and, after drying, peeling off the coat film from the substrate, if desired, by placing the coated substrate in water, for instance.

The molding/processing conditions can adequately be selected according to the method of molding/processing and the composition and amount of the fluoropolymer to be subjected to molding/processing, among others.

The fluoropolymer moldings of the invention, which are obtained from the fluoropolymer aqueous dispersion of the invention or the fluoropolymer powder of the invention, are excellent in thermal stability, chemical resistance, durability, weather resistance, surface characteristics, mechanical characteristics and other physical properties.

EFFECTS OF THE INVENTION

The method of producing a fluoropolymer aqueous dispersion according to the invention, which has the above-mentioned constitution, can efficiently produce a fluoropolymer aqueous dispersion very low in fluorine-containing surfactant content and high in solid matter concentration.

The fluoropolymer aqueous dispersion of the invention, which has the constitution described hereinabove, is excellent in dispersion stability of the particle comprising the fluoropolymer and is good processability in post-treatment and molding/processing and can give a fluoropolymer molding having good physical properties.

The fluoropolymer powder of the invention, which has the constitution described hereinabove, is excellent in moldability/processability. The fluoropolymer molding of the invention, which has the constitution described hereinabove, is excellent in thermal stability, chemical resistance, durability, weather resistance, surface characteristics, mechanical characteristics and other physical properties.

BEST MODES FOR CARRYING OUT THE INVENTION

The following experiment examples are further illustrative of the present invention. These experiment examples are, however, by no means limitative of the scope of the invention.

The measurements carried out in each synthesis example and in each experiment example were carried out by the methods given below.

(1) Average Primary Particle Diameter

The dispersion was diluted to a solid matter concentration of 0.02% by mass and the transmittance, per unit length, of incident light at 550 nm, is measured and that diameter was indirectly determined based on a working curve constructed so as to show the relation between such transmittance and the average particle diameter determined by electron photomicrography.

(2) Solid Matter Concentration

The aqueous dispersion obtained was dried at 380° C. for 1 hour and that concentration was calculated based on the resulting loss in mass.

(3) Standard Specific Gravity [SSG]

The SSG was determined according to ASTM D 1457-69.

(4) Fluorine-Containing Surfactant Concentration in Fluoropolymer Aqueous Dispersion Aqueous solutions of each fluorine-containing surfactant having respective concentrations of 10 ppm, 100 ppm and 500 ppm were subjected to HPLC under the following conditions: column: ODS 120A (Tosoh), developing solution: acetonitrile/0.05 M aqueous solution of phosphoric acid=60/40 (vol/vol %), flow rate: 1.0 ml/minute, sample size: 20 μL, column temperature: 40° C., detection light: UV 210 nm. Based on the data obtained, a working curve showing the relation between the concentration, in aqueous solution, of each fluorine-containing surfactant and the peak area for each fluorine-containing surfactant was constructed.

An equal volume of methanol was added to the measurement target aqueous dispersion and, after thorough mixing, the mixture was allowed to stand. The amount of the fluorine-containing surfactant contained in the supernatant was determined by HPLC under the conditions given above, and the concentration was determined based on the fluorine-containing surfactant peak area obtained using the above working curve.

(5) Octanol/Water Partition Coefficient

Standard substances (heptanoic acid, octanoic acid, nonanoic acid and decanoic acid) each having a known octanol/water partition coefficient were subjected to HPLC under the following conditions: column: Tosoh ODS-120T column (φ 4.6 mm×250 mm), eluent: acetonitrile/0.6% (by mass) aqueous solution of $HClO_4$=1/1 (vol/vol %), flow rate: 1.0 ml/minute, sample size: 300 μL, column temperature: 40° C., detection light: UV 210 nm. A working curve showing the relation between the elution time and the known octanol/water partition coefficient was then constructed. The coefficient in question was determined from the elution time in HPLC for the sample solution based on that working curve.

Synthesis Example 1

Preparation of a Pretreatment TFE Homopolymer Aqueous Dispersion

A 3-liter stainless steel pressure vessel equipped with a stirring impeller was charged with 1450 mL of deionized water, 60 g of paraffin wax (melting point 60° C.) and 1.90 g ($3.5 \times 10^{-3}$ mol/L of deionized water, 0.13% by mass) of fluorine-containing compound 1 [$H(CF_2CF_2)_3COONH_4$], and the oxygen concentration in the pressure vessel was reduced to 5 ppm by repeating nitrogen feeding under pressure, followed by pressure release. The vessel inside was substituted with TFE and, at 70° C., monomeric TFE was further fed under pressure until arrival of the inside pressure at 0.78 MPa, and the vessel was further charged with 50 g of a 0.06% (by mass) aqueous solution of ammonium persulfate (APS) to initiate the reaction. Since otherwise the system inside pressure would lower with the progress of the reaction, TFE was continuously fed to thereby maintain the inside pressure at 0.78 MPa. At the time when the amount of the TFE monomer fed arrived at a level corresponding to an aqueous dispersion having a solid matter concentration of about 27% by mass, the stirring was discontinued, followed by pressure release and purging. A TFE homopolymer aqueous dispersion was thus obtained.

Synthesis Examples 2 to 5

TFE homopolymer aqueous dispersions were prepared in the same manner as in Synthesis Example 1 except that the fluorine-containing surfactant species and the levels of addition thereof as given in Table 1 were respectively employed.

Typical physical properties of the respective aqueous dispersions obtained are shown in Table 1.

TABLE 1

| Synthesis Example | Fluorine-containing surfactant | logP | Fluorine-containing surfactant amount (g) | Fluorine-containing surfactant concentration (% by mass) | Fluorine-containing surfactant concentration (mol/L) | Polymerization time (hours) | Solid matter concentration (% by mass) | Average primary particle diameter (nm) | SSG |
|---|---|---|---|---|---|---|---|---|---|
| 1 | Fluorine-containing surfactant 1 | 2.4 | 1.90 | 0.13 | $3.5 \times 10^{-3}$ | 4.0 | 27.2 | 339 | 2.220 |
| 2 | Fluorine-containing surfactant 2 | 2.5 | 1.82 | 0.13 | $3.5 \times 10^{-3}$ | 4.9 | 26.8 | 297 | 2.207 |
| 3 | Fluorine-containing surfactant 3 | 3.4 | 2.42 | 0.13 | $3.5 \times 10^{-3}$ | 5.5 | 27.2 | 264 | 2.209 |
| 4 | Fluorine-containing surfactant 4 | 3.0 | 2.00 | 0.17 | $3.5 \times 10^{-3}$ | 5.0 | 27.0 | 330 | 2.215 |
| 5 | Fluorine-containing surfactant 5 | 3.5 | 2.25 | 0.14 | $3.5 \times 10^{-3}$ | 6.0 | 27.1 | 227 | 2.190 |

Fluorine-containing surfactant 1: $H(CF_2CF_2)_3COONH_4$
Fluorine-containing surfactant 2: $C_3F_7OCF(CF_3)COONH_4$
Fluorine-containing surfactant 3: $CF_3O(CF(CF_3)CF_2O)CF(CF_3)COONH_4$
Fluorine-containing surfactant 4: $CF_3CF_2(CF_2CF_2)_2COONH_4$
Fluorine-containing surfactant 5: $CF_3(CF_2CF_2)_3COONH_4$
logP: octanol/water partition coefficient Experiment Example 1

Preparation of a TFE Homopolymer Aqueous Dispersion

The TFE homopolymer aqueous dispersion obtained in Synthesis Example 1 was used as a pretreatment fluoropolymer aqueous dispersion. Thereto was added the surfactant Triton X-100 (product of Union Carbide) in an amount of 10% by mass of the solid matter mass of the TFE homopolymer aqueous dispersion, the pH was adjusted to 10 by further addition of 28% (by mass) aqueous ammonia, and the dispersion was diluted with water to a solid matter concentration of 26% by mass. After gentle stirring for attaining uniform dispersion, the dispersion was allowed to stand at 70° C. for 6 hours. The resulting supernatant and sediment were fractions then separated from each other, and the mass ratio $\chi$ between the aqueous dispersion ($M_{init}$) prior to concentration and the supernatant fraction ($M_{spn}$), the fluorine-containing surfactant concentration (Cs) in the supernatant fraction, and the fluorine-containing surfactant concentration (Cp) in the sediment fraction were determined.

Further, the mass ratio ($M^1/M^0$) between the amount ($M^1$) of the fluorine-containing surfactant in the supernatant fraction and the amount ($M^0$) of the fluorine-containing surfactant in the aqueous dispersion before concentration was calculated based on the fluorine-containing surfactant concentration (Cs) in the supernatant fraction. Further, the solid matter concentration in the TFE homopolymer aqueous dispersion corresponding to the sediment fraction taken out following separation was measured.

Experiment Examples 2 to 5

TFE homopolymer aqueous dispersions were obtained in the same manner as in Experiment Example 1 except that the TFE homopolymer aqueous dispersions obtained in Synthesis Examples 2 to 5 were respectively used in lieu of that used in Experiment Example 1.

The results obtained in Experiment Examples 1 to 5 are shown in Table 2.

TABLE 2

| Experiment Example | Pretreatment fluoropolymer aqueous dispersion | $\chi$ (% by mass) | Cs (ppm) | $M^1/M^0$ | Cp (ppm) | Solid matter concentration (% by mass) after concentration treatment |
|---|---|---|---|---|---|---|
| 1 | Synthesis Example 1 | 61 | 1037 | 0.84 | 289 | 69.1 |
| 2 | Synthesis Example 2 | 61 | 998 | 0.84 | 282 | 68.5 |
| 3 | Synthesis Example 3 | 60 | 790 | 0.52 | 697 | 68.1 |
| 4 | Synthesis Example 4 | 61 | 943 | 0.71 | 399 | 68.8 |

TABLE 2-continued

| Experiment Example | Pretreatment fluoropolymer aqueous dispersion | χ (% by mass) | Cs (ppm) | $M^1/M^0$ | Cp (ppm) | Solid matter concentration (% by mass) after concentration treatment |
|---|---|---|---|---|---|---|
| 5 | Synthesis Example 5 | 59 | 467 | 0.32 | 814 | 67.2 |

Cs: Fluorine-containing surfactant concentration in the supernatant fraction
χ: Mass ratio between aqueous dispersion before concentration treatment ($M_{init}$) and supernatant ($M_{spn}$) χ = ($M_{spn}/M_{init}$) * 100
($M^1/M^0$): Mass ratio between the amount ($M^1$) of the fluorine-containing surfactant in the supernatant fraction and the amount ($M^0$) of the fluorine-containing surfactant in the aqueous dispersion before concentration
Cp: Fluorine-containing surfactant concentration in the sediment fraction The TFE homopolymer aqueous dispersions obtained in Experiment Examples 1 to 4 each gave an $M^1/M^0$ value exceeding 0.5 and, in particular, the TFE homopolymer aqueous dispersions obtained in Experiment Examples 1 and 2 each gave an $M^1/M^0$ value exceeding 0.8, whereas the TFE homopolymer aqueous dispersion obtained in Experiment Example 5 gave an $M^1/M^0$ value of 0.3. The greater the $M^1/M^0$ value is, the smaller the amount of the residual fluorine-containing surfactant in the sediment fraction is. Therefore, the TFE homopolymer aqueous dispersions obtained in Experiment Examples 1 to 4, in particular the TFE homopolymer aqueous dispersion obtained in Experiment Examples 1 and 2, are supposed to have been obtained as a result of efficient removal of the fluorine-containing surfactant in the above-mentioned concentration treatment.

INDUSTRIAL APPLICABILITY

The method of producing a fluoropolymer aqueous dispersion according to the invention, which has the above-mentioned constitution, can efficiently produce a fluoropolymer aqueous dispersion very low in fluorine-containing surfactant content and high in solid matter concentration.

The fluoropolymer aqueous dispersion of the invention, which has the constitution described hereinabove, is excellent in dispersion stability of the particle comprising the fluoropolymer and is good processability in post-treatment and molding/processing and can give a fluoropolymer molding having good physical properties.

The fluoropolymer powder of the invention, which has the constitution described hereinabove, is excellent in moldability/processability. The fluoropolymer molding of the invention, which has the constitution described hereinabove, is excellent in thermal stability, chemical resistance, durability, weather resistance, surface characteristics, mechanical characteristics and other physical properties.

The invention claimed is:

1. A method of producing a fluoropolymer aqueous dispersion which comprises carrying out a concentration treatment comprising a concentration operation of a pretreatment fluoropolymer aqueous dispersion, wherein said pretreatment fluoropolymer aqueous dispersion is obtained by carrying out a polymerization in an aqueous medium in the presence of a fluorine-containing surfactant (A), said fluorine-containing surfactant (A) is a fluorine-containing surfactant having an octanol/water partition coefficient of 1.5 to 3.4.

2. The method of producing a fluoropolymer aqueous dispersion according to claim 1, wherein the ratio $[M^1/M^0]$ between the mass $[M^0]$ of the fluorine-containing surfactant (A) in the pretreatment fluoropolymer aqueous dispersion and the mass $[M^1]$ of the fluorine-containing surfactant (A) removed by carrying out the concentration operation once is not lower than 0.5.

3. The method of producing a fluoropolymer aqueous dispersion according to claim 1, wherein the ratio $[M^1/M^0]$ between the mass $[M^0]$ of the fluorine-containing surfactant (A) in the pretreatment fluoropolymer aqueous dispersion and the mass $[M^1]$ of the fluorine-containing surfactant (A) removed by carrying out the concentration operation once is not lower than 0.6.

4. The method of producing fluoropolymer aqueous dispersion according to claim 1,
wherein the ratio $[M^1/M^0]$ between the mass $[M^0]$ of the fluorine-containing surfactant (A) in the pretreatment fluoropolymer aqueous dispersion and the mass $[M^1]$ of the fluorine-containing surfactant (A) removed by carrying out the concentration operation once is not lower than 0.7.

5. The method of producing a fluoropolymer aqueous dispersion according to claim 1, wherein the fluoropolymer aqueous dispersion has a solid matter concentration of 30 to 80% by mass.

6. The method of producing a fluoropolymer aqueous dispersion according to claim 1, wherein the fluorine-containing surfactant (A) has an octanol/water partition coefficient of 1.5 to 3.0.

7. The method of producing a fluoropolymer aqueous dispersion according to claim 1, wherein a fluoropolymer constituting the pretreatment fluoropolymer aqueous dispersion comprises a tetrafluoroethylene homopolymer and/or a modified polytetrafluoroethylene.

8. The method of producing a fluoropolymer aqueous dispersion according to claim 1, wherein a fluoropolymer constituting the pretreatment fluoropolymer aqueous dispersion is a perfluoropolymer.

9. A fluoropolymer aqueous dispersion which is obtained by the method of producing a fluoropolymer aqueous dispersion according to claim 1.

10. A fluoropolymer powder which is obtained by drying a wet powder obtained by coagulation of the fluoropolymer aqueous dispersion according to claim 9.

11. A fluoropolymer molding which is obtained by carrying out a molding/processing using the fluoropolymer powder according to claim 10.

* * * * *